(12) United States Patent
Tran et al.

(10) Patent No.: US 12,711,775 B2
(45) Date of Patent: Aug. 18, 2026

(54) SYSTEM AND METHOD FOR AUTOMATICALLY IDENTIFYING VEHICLE PANELS REQUIRING PAINT BLENDING

(71) Applicant: Mitchell International, Inc., San Diego, CA (US)

(72) Inventors: Tran Huyen Tran, San Diego, CA (US); Jerry Gastineau, San Diego, CA (US); Abhijeet Gulati, San Diego, CA (US); Mohnish Singh, San Diego, CA (US); Divik Kashyap, San Diego, CA (US); Dune Pagaduan, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 207 days.

(21) Appl. No.: 18/232,072

(22) Filed: Aug. 9, 2023

(65) Prior Publication Data

US 2024/0087330 A1 Mar. 14, 2024

Related U.S. Application Data

(60) Provisional application No. 63/405,785, filed on Sep. 12, 2022.

(51) Int. Cl.
*G06V 20/56* (2022.01)
*G06T 7/11* (2017.01)

(52) U.S. Cl.
CPC ................ *G06V 20/56* (2022.01); *G06T 7/11* (2017.01); *G06T 2207/20081* (2013.01)

(58) Field of Classification Search
CPC .......... G06N 20/20; G06N 3/048; G06N 3/09; G06N 5/01; G06N 5/022; G06Q 10/20; G06Q 30/0283; G06Q 30/0611; G06Q 40/08; G06Q 50/40; G06T 2207/20081; G06T 7/11; G06V 10/46; G06V 10/764; G06V 20/56
See application file for complete search history.

(56) References Cited

U.S. PATENT DOCUMENTS 10,713,865 B2 7/2020 Wang et al.
10,719,863 B2 7/2020 Wang et al.
2009/0074250 A1* 3/2009 Takahashi .............. G06V 10/56 382/104
2018/0260793 A1* 9/2018 Li .......................... G06Q 40/08
2021/0201474 A1* 7/2021 Sharma .................. G06T 7/579
(Continued)

*Primary Examiner* — Matthew C Bella
(74) *Attorney, Agent, or Firm* — Sheridan Ross P.C.

(57) ABSTRACT

A computer-implemented method comprises receiving an image of a vehicle having damage to a first exterior body panel; providing the image to one or more trained machine learning models that are configured to identify a first region of the first exterior body panel to be repaired and a second region to be paint-blended, when the second region contains a second exterior body panel of the vehicle other than the first exterior body panel, generating an exterior body panel repainting list that includes the identification of the first exterior body panel of the vehicle and the identification of the second exterior body panel of the vehicle; querying a repainting cost database using the exterior body panel repainting list; and receiving a repainting cost estimate from the repainting cost database responsive to the querying.

18 Claims, 4 Drawing Sheets

(56) References Cited

U.S. PATENT DOCUMENTS

| | | | | |
|---|---|---|---|---|
| 2021/0224975 | A1* | 7/2021 | Ranca | G06N 3/04 |
| 2023/0014490 | A1* | 1/2023 | Terliuc | A61B 1/000096 |
| 2023/0154101 | A1* | 5/2023 | Bradley | G06T 7/62 |
| | | | | 345/426 |

* cited by examiner

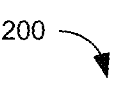

Receive one or more images of a vehicle having damage to a first exterior body panel of the vehicle. 202

↓

Determine a first region of the first exterior body panel to be repaired based on the one or more images of the vehicle. 204

↓

Calculate a cost of repairing the first body panel of the vehicle. 206

↓

Determine a second region to be paint-blended based on the one or more images of the vehicle. 208

↓

Determine whether the second region contains one or more second exterior body panels of the vehicle other than the first exterior body panel. 210

↓

Responsive to determining the second region contains one or more second exterior body panels of the vehicle other than the first exterior body panel, identify the one or more second exterior body panels of the vehicle. 212

↓

Calculate a cost of painting the identified the first and second exterior body panel(s) of the vehicle. 214

↓

Calculate a total cost of repairing and repainting the vehicle. 216

↓

Provide cost estimate to a claims adjuster. 218

FIG. 2

SYSTEM AND METHOD FOR AUTOMATICALLY IDENTIFYING VEHICLE PANELS REQUIRING PAINT BLENDING

CROSS REFERENCE TO RELATED APPLICATIONS

The present application claims priority to U.S. Provisional Patent Application No. 63/405,785, filed Sep. 12, 2022, entitled "SYSTEM AND METHOD FOR AUTOMATICALLY IDENTIFYING VEHICLE PANELS REQUIRING PAINT BLENDING," the disclosure thereof incorporated by reference herein in its entirety.

DESCRIPTION OF RELATED ART

The disclosed technology relates generally to estimates for vehicle repair and repainting, and more particularly some embodiments relate to automatically generating cost estimates for vehicle repair and repainting.

SUMMARY

In general, one aspect disclosed features a system for automatically identifying a set of vehicle panels for paint blending, the system comprising: one or more hardware processors; and a non-transitory machine-readable storage medium encoded with instructions executable by the one or more hardware processors to cause the system to perform operations comprising: receiving an image of a vehicle having damage to a first exterior body panel of the vehicle; providing the image to one or more trained machine learning models, wherein based on the image of the vehicle, the one or more trained machine learning models are configured to determine a first region of the first exterior body panel to be repaired and a second region to be paint-blended, wherein output of the one or more trained machine learning models comprises an identification of the first region, an identification of the second region, and a confidence value associated with the second region, and wherein the one or more trained machine learning models trained with historical examples of the first regions, corresponding second regions, and corresponding confidence values; when the confidence value associated with the second region exceeds a confidence threshold and the second region contains a second exterior body panel of the vehicle other than the first exterior body panel, generating an exterior body panel repainting list that includes the identification of the first exterior body panel of the vehicle and the identification of the second exterior body panel of the vehicle; querying a repainting cost database using the exterior body panel repainting list; and receiving a repainting cost estimate from the repainting cost database responsive to the querying.

Embodiments of the system may include one or more of the following features. In some embodiments, the operations further comprise: determining a repair cost estimate for repairing the first exterior body panel; and generating a repair and repainting cost estimate based on the repainting cost estimate and the repair cost estimate. In some embodiments, determining a repair cost estimate for repairing the first exterior body panel comprises: determining a severity of damage to the first exterior body panel. In some embodiments, the operations further comprise: providing the repair and repainting cost estimate to a claims adjuster. In some embodiments, the operations further comprise: obtaining one or more training data sets comprising the historical examples of the first regions, corresponding second regions, and corresponding confidence values; and training the one or more trained machine learning models using the training data set. In some embodiments, the operations further comprise: generating the one or more training data sets. In some embodiments, the first region is a first polygon; and the second region is a second polygon.

In general, one aspect disclosed features one or more non-transitory machine-readable storage media encoded with instructions that, when executed by one or more hardware processors of a computing system, cause the computing system to perform operations comprising: receiving an image of a vehicle having damage to a first exterior body panel of the vehicle; providing the image to one or more trained machine learning models, wherein based on the image of the vehicle, the one or more trained machine learning models are configured to determine a first region of the first exterior body panel to be repaired and a second region to be paint-blended, wherein output of the one or more trained machine learning models comprises an identification of the first region, an identification of the second region, and a confidence value associated with the second region, and wherein the one or more trained machine learning models trained with historical examples of the first regions, corresponding second regions, and corresponding confidence values; when the confidence value associated with the second region exceeds a confidence threshold and the second region contains a second exterior body panel of the vehicle other than the first exterior body panel, generating an exterior body panel repainting list that includes the identification of the first exterior body panel of the vehicle and the identification of the second exterior body panel of the vehicle; querying a repainting cost database using the exterior body panel repainting list; and receiving a repainting cost estimate from the repainting cost database responsive to the querying.

Embodiments of the media may include one or more of the following features. In some embodiments, the operations further comprise: determining a repair cost estimate for repairing the first exterior body panel; and generating a repair and repainting cost estimate based on the repainting cost estimate and the repair cost estimate. In some embodiments, determining a repair cost estimate for repairing the first exterior body panel comprises: determining a severity of damage to the first exterior body panel. In some embodiments, the operations further comprise: providing the repair and repainting cost estimate to a claims adjuster. In some embodiments, the operations further comprise: obtaining one or more training data sets comprising the historical examples of the first regions, corresponding second regions, and corresponding confidence values; and training the one or more trained machine learning models using the training data set. In some embodiments, the operations further comprise: generating the one or more training data sets. In some embodiments, the first region is a first polygon; and the second region is a second polygon.

In general, one aspect disclosed features a computer-implemented method comprising: receiving an image of a vehicle having damage to a first exterior body panel of the vehicle; providing the image to one or more trained machine learning models, wherein based on the image of the vehicle, the one or more trained machine learning models are configured to determine a first region of the first exterior body panel to be repaired and a second region to be paint-blended, wherein output of the one or more trained machine learning models comprises an identification of the first region, an identification of the second region, and a confidence value associated with the second region, and wherein the one or more trained machine learning models trained with historical examples of the first regions, corresponding second regions, and corresponding confidence values; when the confidence value associated with the second region exceeds a confidence threshold and the second region contains a second exterior body panel of the vehicle other than the first exterior body panel, generating an exterior body panel repainting list that includes the identification of the first exterior body panel of the vehicle and the identification of the second exterior body panel of the vehicle; querying a repainting cost database using the exterior body panel repainting list; and receiving a repainting cost estimate from the repainting cost database responsive to the querying.

Embodiments of the method may include one or more of the following features. Some embodiments comprise determining a repair cost estimate for repairing the first exterior body panel; and generating a repair and repainting cost estimate based on the repainting cost estimate and the repair cost estimate. In some embodiments, determining a repair cost estimate for repairing the first exterior body panel comprises: determining a severity of damage to the first exterior body panel. Some embodiments comprise providing the repair and repainting cost estimate to a claims adjuster. Some embodiments comprise obtaining one or more training data sets comprising the historical examples of the first regions, corresponding second regions, and corresponding confidence values; and training the one or more trained machine learning models using the training data set. Some embodiments comprise generating the one or more training data sets.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 illustrates a process for vehicle repair and repainting cost estimation according to some embodiments of the disclosed technology.

The figures are not exhaustive and do not limit the present disclosure to the precise form disclosed.

DETAILED DESCRIPTION

Vehicles having damage to an exterior body panel require repair and repainting. However, it is difficult to color-match the repainted exterior panel with surrounding panels. Generally, the area to be repainted is larger than the area of the damage. Furthermore, the area to be repainted is surrounded by a blending area where the color of the new paint must be blended to color-match the original paint. In some cases, the damaged exterior panel is large enough to contain the blending area. But in other cases, the blending area exceeds the damaged exterior panel and includes one or more of the surrounding exterior panels. In such cases, the cost of the repair grows substantially, and must be reflected in the cost estimate for the repair and repainting of the vehicle. Currently, the determination of whether to repaint one or more panels surrounding the damaged panel is highly subjective and error-prone, leading to inaccurate and potentially incomplete estimates, depending on the experience of the appraiser.

Embodiments of the disclosure provide systems and methods for automatically identifying any additional vehicle panels requiring paint blending, and determining accurate total cost estimates for the repair and repainting of the vehicle.

Figure 1:
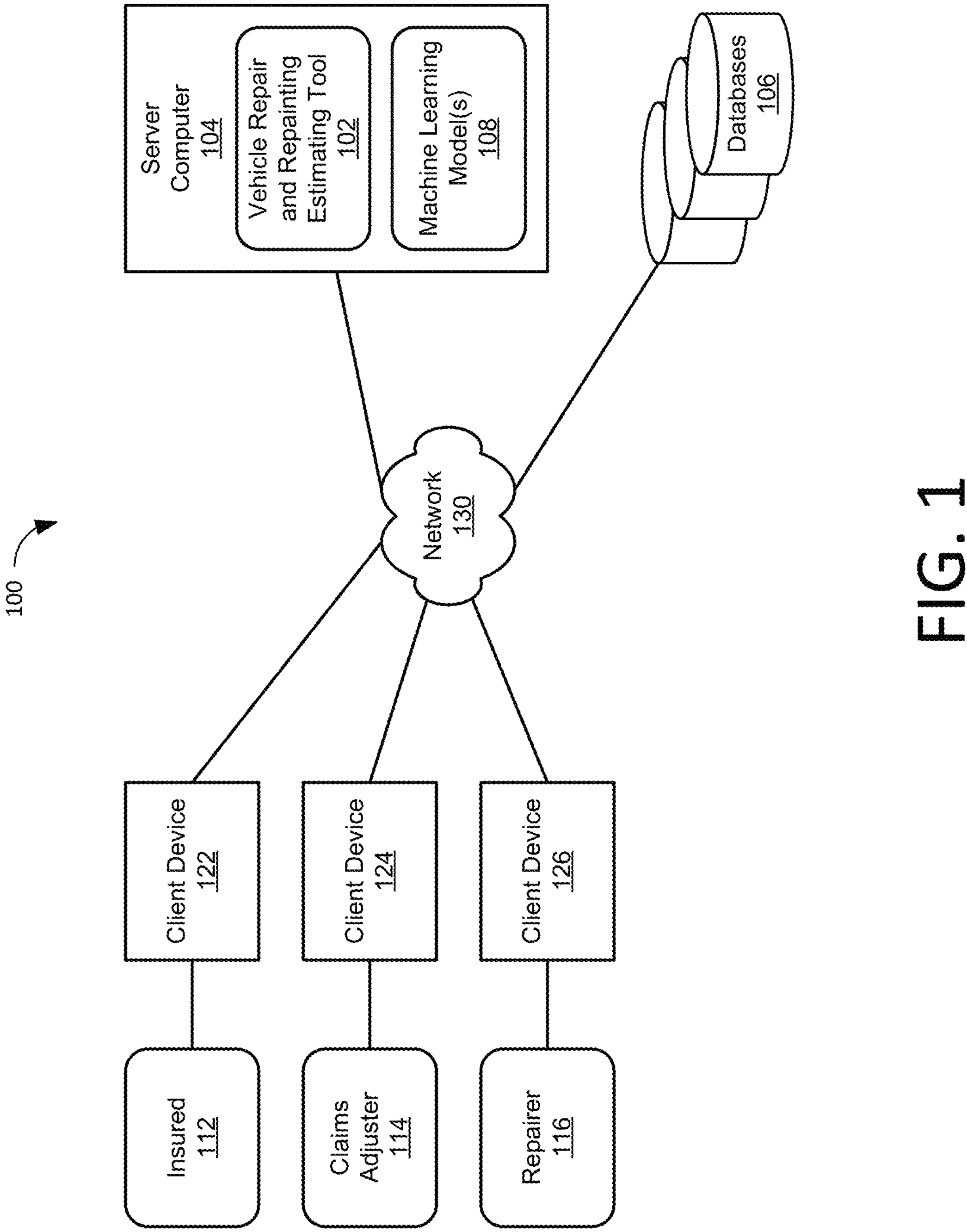
FIG. 1 illustrates a system for automatically identifying vehicle panels requiring paint blending according to some embodiments of the disclosed technology.

FIG. 1 illustrates a system for automatically identifying vehicle panels requiring paint blending 100 according to some embodiments of the disclosed technology. The system 100 may include a Vehicle Repair and Repainting Estimating Tool 102. The tool 102 may be implemented as one or more software packages executing on one or more server computers 104. The tool 102 may include one or more machine learning models 108. The machine learning models 108 may be implemented in any manner. The machine learning models 108 may be implemented as trained machine learning models, for example as described below. The system 100 may include one or more databases 106. In some embodiments, the databases 106 may store rules for execution by the tool 102. In some embodiments, the databases 106 may store information describing exterior body panels of vehicles. Databases 106 may also store information regarding the location and association of neighboring panels. This information may include costs for repairing and repainting the body panels, and may be indexed for severity of damage to the panels.

Multiple users may interact with the tool 102. For example, referring to FIG. 1, the users may include the vehicle owner or insured party 112, a claims adjuster 114, a vehicle repairer 116, and the like. Each user may employ a respective device or system. The insured party 112 may employ a client device 122. The claims adjuster 114 may employ a client device 124. The repairer 116 may employ a client device 126. Each device may be implemented as a computer, smart phone, smart glasses, electronic embedded computers and displays, and the like. Each user may employ the client device to access the tool 102 over a network 130 such as the Internet.

FIG. 2 illustrates a process 200 for vehicle repair and repainting cost estimation according to some embodiments of the disclosed technology. The elements of the disclosed processes are presented in a particular order. However, it should be understood that, in various embodiments, one or more elements may be performed in a different order, in parallel, or omitted. Portions of the process 200 may be performed, for example, by the tool 102 of FIG. 1.

Figure 3:
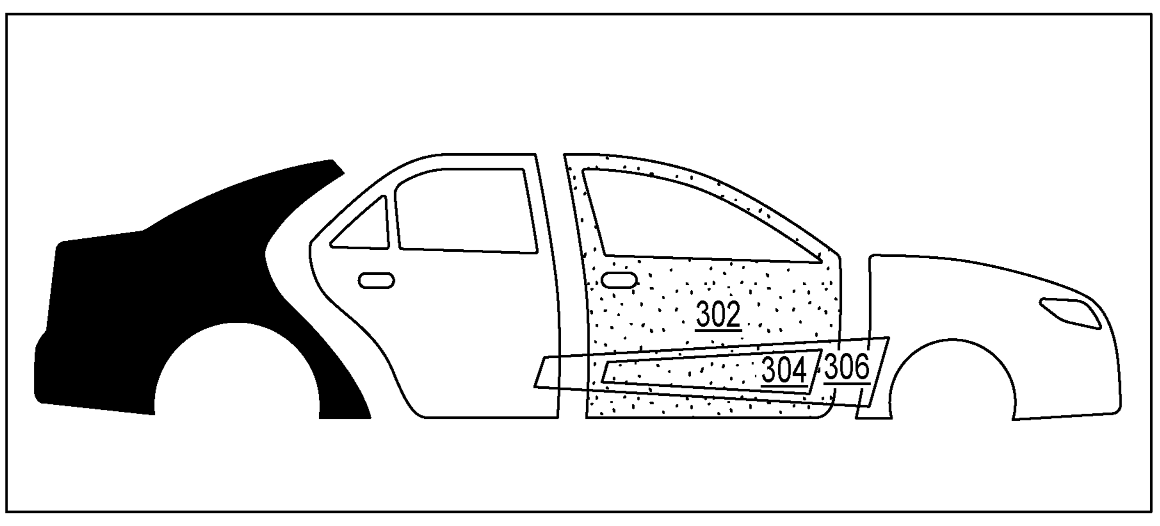
FIG. 3 illustrates an example user interface according to some embodiments of the disclosed technology.

Referring again to FIG. 2, the process 200 may include receiving one or more images of a vehicle having damage to a first exterior body panel of the vehicle, at 202. The images may include photographs or other scans of the exterior of the vehicle. As used herein, the term "image" may refer to a single image or a video stream. The images may be part of a video stream. The tool may present the images to a user in a user interface. FIG. 3 illustrates an example user interface according to some embodiments of the disclosed technology.

Referring again to FIG. 2, the process 200 may include determining a first region of the first exterior body panel to be repaired based on the received one or more images of the vehicle, at 204. This determination may include determining a confidence value associated with the first region. This determination may include identifying the damaged exterior body panel. This determination may include determining a severity of damage to the first exterior body panel. Some techniques for identifying an area of damage, including one or more exterior body panels, from images of a damaged vehicle are described in related U.S. patent application Ser. No. 17/127,518, filed Dec. 18, 2020, entitled "SYSTEMS AND METHODS FOR AUTOMATICALLY DETERMINING ADJACENT PANEL DEPENDENCIES DURING DAMAGE APPRAISAL," the disclosure thereof incorporated by reference herein in its entirety.

Referring again to FIG. 3, a damaged exterior body panel is shown at 302. For clarity the disclosed technology is described in terms of a single damaged exterior body panel. However, it should be apparent to one skilled in the relevant arts that the disclosed technologies may apply to cases involving multiple damaged exterior body panels, which may be adjacent or not. In some embodiments, the determination of the region to be repaired may include circumscribing the region to be repaired with a first shape. The shape may be a polygon. In the example of FIG. 3, the determined region to be repaired is shown as a polygon 304. For clarity the disclosed technology is described in terms of polygons. However, it should be apparent to one skilled in the relevant arts that the disclosed technologies may employ other shapes instead of, or in addition to, polygons.

Referring again to FIG. 2, the process 200 may include calculating a cost of repairing the first body panel of the vehicle, at 206. This cost may be based on the determined severity of the determined damage to the first exterior body panel and/or an area of the first region. This calculation may include retrieving vehicle information from the database(s) 106 of FIG. 1.

Referring again to FIG. 2, the process 200 may include determining a second region to be paint-blended based on the one or more images of the vehicle, at 208. This second region includes areas beyond the region to be repaired, where processes such as sanding and painting may be required. In some embodiments, the determination of the second region may include circumscribing the second region with a second shape. The shape may be a polygon. In the example of FIG. 3, the second region is shown as a polygon 306.

In some embodiments, determining any of the first region, the severity of damage to the first exterior body panel, and the second region may employ one or more trained machine learning models, for example as described in detail below. For example, a first trained machine learning model may determine the first region and the severity of damage based on the images of the damaged vehicle. Then a second trained machine learning model may determine the second region based on the output of the first trained machine learning model, which may be augmented by the images of the damaged vehicle. Other arrangements of models, inputs, and outputs are contemplated.

Figure 4:
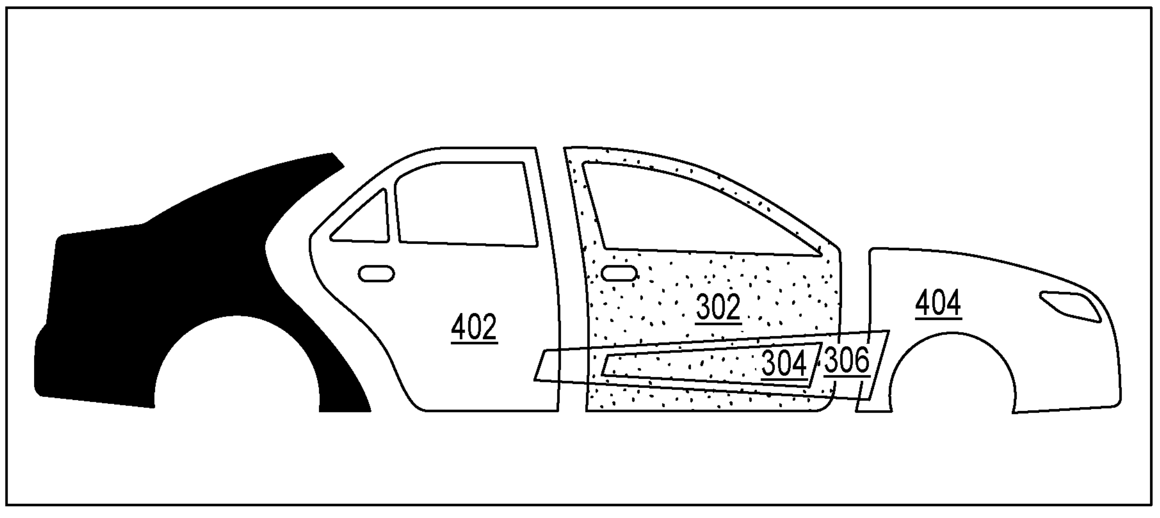
FIG. 4 illustrates the user interface of FIG. 3, with two second body panels identified.

Referring again to FIG. 2, the process 200 may include determining whether the second region contains one or more second exterior body panels of the vehicle other than the first exterior body panel, at 210. Responsive to determining the second region contains one or more second exterior body panels of the vehicle other than the first exterior body panel, the process 200 may include identifying the one or more second exterior body panels of the vehicle, at 212. FIG. 4 illustrates the user interface of FIG. 3, with two second body panels 402 and 404 identified.

In some embodiments, the trained machine learning model(s) output not only the determination of the second region, but also an associated confidence value. When the confidence value exceeds a confidence threshold and the second region contains a second exterior body panel of the vehicle other than the first exterior body panel, the tool 102 may identify the second body panel as requiring repainting.

Referring again to FIG. 2, the process 200 may include calculating a cost of painting the first exterior body panel and the identified one or more second exterior body panels of the vehicle, at 214. The cost of painting the second exterior body panel(s) may include the cost to color-blend with the repainted first body panel of the vehicle. This calculation may include retrieving vehicle information from the database(s) 106 of FIG. 1. This calculation may also include additional labor operations and materials may also be included as a result of the calculations for the adjacent panels. For example, the tool 102 may generate an exterior body panel repainting list that includes the identification of the first exterior body and the identification of the second exterior body panel(s). The tool 102 may query a repainting cost database using the exterior body panel repainting list, and receive a repainting cost estimate from the repainting cost database responsive to the querying.

Referring again to FIG. 2, the process 200 may include calculating a total cost of repairing and repainting the vehicle, at 216. The process may conclude with generating a cost estimate based on the total cost of repairing and repainting the vehicle, and providing the cost estimate to a claims adjuster, at 218.

In some embodiments, the disclosed technologies may include the use of one or more trained machine learning models at one or more points in the described processes. Any machine learning models may be used. For example, the machine learning models and techniques may include classifiers, decision trees, neural networks, gradient boosting, and similar machine learning models and techniques. The machine learning models may be trained previously according to historical correspondences between inputs and corresponding outputs. Once the machine learning models have been trained, new inputs may be applied to the trained machine learning model as inference inputs. In response, the machine learning models may provide the desired outputs. For example, a neural network may be trained and applied to receive an image or video of a damaged vehicle and output any of an identification of a corresponding region to be repaired, an identification of a region to be paint-blended, and an index of severity of the damage. The output generated may be illustrated via a heatmap which overlays the regions requiring repairs.

The neural network may include a feature extraction layer that extracts features from the input data, e.g., an image of a damaged vehicle, an index of a severity of damage, or an identification of a region to be repaired. In some embodiments, this process may be performed after input data preprocessing. The preprocessing may include input data transformation. The input data transformation may include converting different file types (e.g., image format, video format, word format, etc.) into a unified digital format (e.g., pdf file). The preprocessing may include data extraction. The data extraction may include extracting useful information, for example using image processing techniques.

The feature extraction in the feature extraction layer may be performed against the extracted data. The selection of the features for extraction may also be determined by learning importance scores for the candidate features using a tree-based machine learning model.

For example, the tree-based machine learning model for feature selection may use Random Forests or Gradient Boosting. The model includes an ensemble of decision trees that collectively make predictions. To begin, the tree-based model may be trained on a labeled dataset. The dataset may include historical vehicle damage images with corresponding regions to be repaired. The actual workflows may be used as the ground truth labels for training purposes. The training data may include rules of adjacency across all exterior panels. Rules of adjacency may cover several approaches and also may include a knowledge graph of neighboring exterior panels (for example: Hood will have neighbors like [{hood}: {front Bumper}, {Left Fender}, {Right Fender}]. The panels may further be decomposed to include specific components within exterior panels. For example: {Front Bumper} at the panel may further include {Upper Front Bumper} and {Lower Front Bumper} and so on at component level. This knowledge graph as adjacent panels/components may be presented as an input of machine learning model training.

As the tree-based machine learning model learns to make predictions, it recursively splits the data (for example, historical vehicle damage images and historical vehicle damage regions) based on different features, constructing a tree structure that captures patterns in the data. The goal of the training is to make the predictions as close to the ground truth labels as possible. One of the advantages of tree-based models is that they can generate feature importance scores for each input feature. These scores reflect the relative importance of each feature in contributing to the model's predictive power. A higher importance score indicates that a feature has a greater influence on the model's decision-making process.

In some embodiments, Gini importance metric may be used for feature importance in the tree-based model. Gini importance quantifies the total reduction in the Gini impurity achieved by each feature across all the trees in the ensemble. Features that lead to a substantial decrease in impurity when used for splitting the data are assigned higher importance scores.

Once the tree-based model is trained, the feature importance scores may be extracted. By sorting the features in descending order based on their scores, a ranked list of features may be obtained. This ranking enables prioritizing the features that have the most impact on the model's decision-making process.

Based on the feature ranking, the top features may be extracted from inference input(s) and fed into the neural network to identify regions to be repaired and/or repainted.

The neural network may include an output layer that provides output data based on the input data. For example, the output layer of a classifier may use a sigmoid activation function that outputs a probability value between 0 and 1 for each class.

For example, the routing decision process described above for the Vehicle Repair and Repainting Estimating Tool 102 may be implemented using a trained machine learning model. The model may be trained using training data that reflect historic inputs and corresponding outputs. In some embodiments, the training data may include scores and weights of the historical inputs, as well as thresholds employed with the scoring.

During inference operation, a vehicle damage image or video stream may be provided as inference input data to a trained machine learning model. An input layer of the model may extract one or more image features as input data from the image. Responsive to the inference input, an output layer of the model may provide output representing one or more regions and a probability for each region.

Some embodiments include the training of the machine learning models. The training may be supervised, unsupervised, or a combination thereof, and may continue between operations for the lifetime of the system. The training may include creating a training set that includes the input parameters and corresponding assessments described above.

The training may include one or more second stages. A second stage may follow the training and use of the trained machine learning models, and may include creating a second training set, creating a knowledge graph derived from the rules, and training the trained machine learning models using the second training set. The second training set may include the inputs applied to the machine learning models, and the corresponding outputs generated by the machine learning models, during actual use of the machine learning models.

The second training stage may include identifying erroneous assessments generated by the machine learning model, and adding the identified erroneous assessments to the second training set. Creating the second training set may also include adding the inputs corresponding to the identified erroneous assessments to the second training set.

Figure 5:
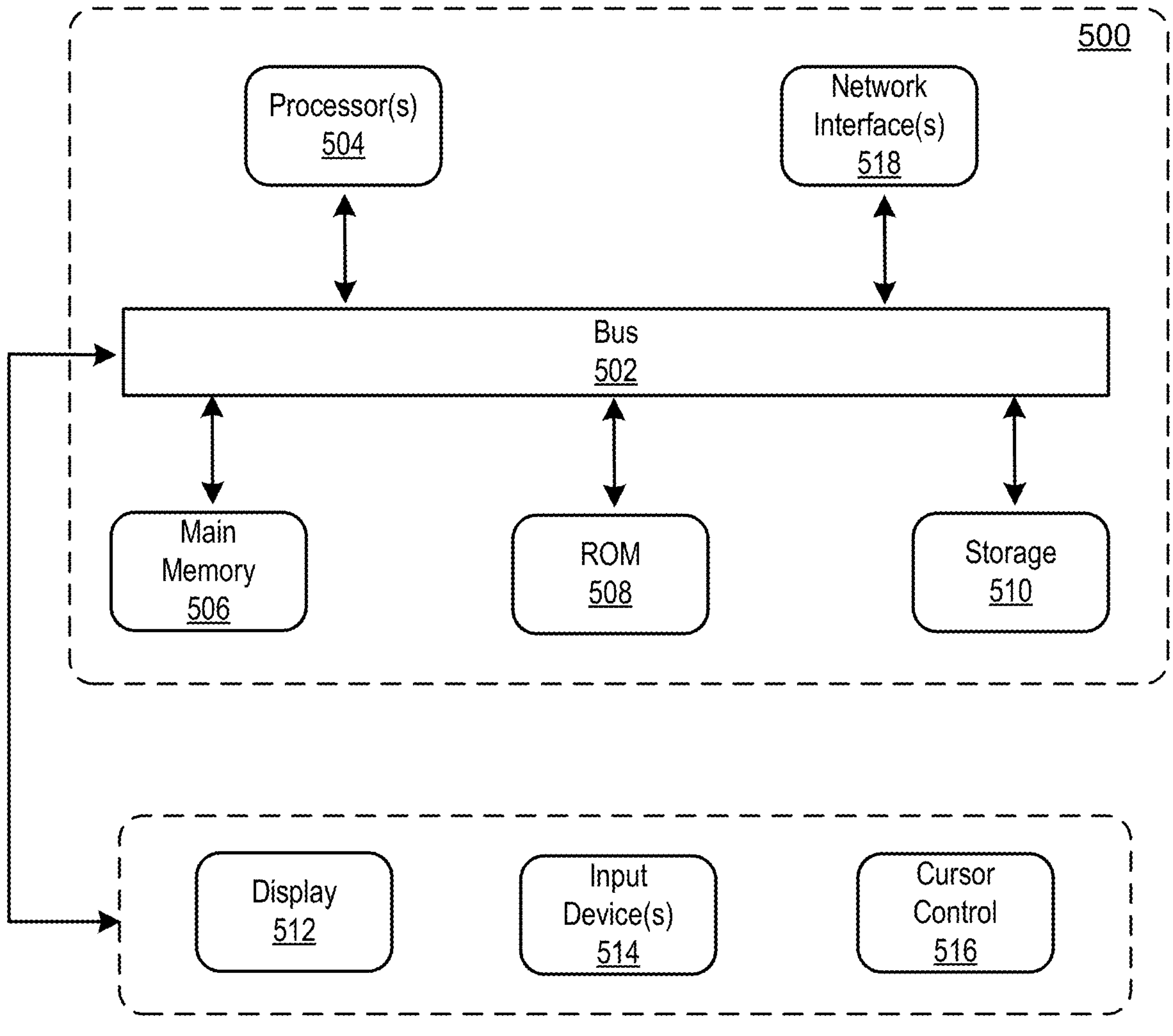
FIG. 5 is an example computing component that may be used to implement various features of embodiments described in the present disclosure.

FIG. 5 depicts a block diagram of an example computer system 500 in which embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or a WAN component to communicate with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A system for automatically identifying a set of vehicle panels for paint blending, the system comprising:

one or more hardware processors; and a non-transitory machine-readable storage medium encoded with instructions executable by the one or more hardware processors to cause the system to perform operations comprising:

receiving an image of a vehicle having damage to a first exterior body panel of the vehicle;

providing the image to one or more trained machine learning models, wherein based on the image of the vehicle, the one or more trained machine learning models are configured to determine a first region of the first exterior body panel to be repaired and a second region to be paint-blended, wherein the second region surrounds the first region, wherein the first region is a first polygon circumscribing the first region and the second region is a second polygon circumscribing the second region, wherein output of the one or more trained machine learning models comprises an identification of the first region, an identification of the second region, and a confidence value associated with the second region, and wherein the one or more trained machine learning models trained with historical examples of the first regions, corresponding second regions, and corresponding confidence values;

when the confidence value associated with the second region exceeds a confidence threshold and the second region contains a second exterior body panel of the vehicle other than the first exterior body panel, generating an exterior body panel repainting list that includes the identification of the first exterior body panel of the vehicle and the identification of the second exterior body panel of the vehicle;

querying a repainting cost database using the exterior body panel repainting list; and receiving a repainting cost estimate from the repainting cost database responsive to the querying.

2. The system of claim 1, the operations further comprising:

determining a repair cost estimate for repairing the first exterior body panel; and generating a repair and repainting cost estimate based on the repainting cost estimate and the repair cost estimate.

3. The system of claim 2, wherein determining a repair cost estimate for repairing the first exterior body panel comprises:

determining a severity of damage to the first exterior body panel.

4. The system of claim 1, the operations further comprising:

providing the repair and repainting cost estimate to a claims adjuster.

5. The system of claim 1, the operations further comprising:

obtaining one or more training data sets comprising the historical examples of the first regions, corresponding second regions, and corresponding confidence values; and training the one or more trained machine learning models using the training data set.

6. The system of claim 5, the operations further comprising:

generating the one or more training data sets.

7. One or more non-transitory machine-readable storage media encoded with instructions that, when executed by one or more hardware processors of a computing system, cause the computing system to perform operations comprising:

receiving an image of a vehicle having damage to a first exterior body panel of the vehicle;

providing the image to one or more trained machine learning models, wherein based on the image of the vehicle, the one or more trained machine learning models are configured to determine a first region of the first exterior body panel to be repaired and a second region to be paint-blended, wherein the second region surrounds the first region, wherein the first region is a first polygon circumscribing the first region and the second region is a second polygon circumscribing the second region, wherein output of the one or more trained machine learning models comprises an identification of the first region, an identification of the second region, and a confidence value associated with the second region, and wherein the one or more trained machine learning models trained with historical examples of the first regions, corresponding second regions, and corresponding confidence values;

when the confidence value associated with the second region exceeds a confidence threshold and the second region contains a second exterior body panel of the vehicle other than the first exterior body panel, generating an exterior body panel repainting list that includes the identification of the first exterior body panel of the vehicle and the identification of the second exterior body panel of the vehicle;

querying a repainting cost database using the exterior body panel repainting list; and receiving a repainting cost estimate from the repainting cost database responsive to the querying.

8. The one or more non-transitory machine-readable storage media of claim 7, the operations further comprising:

determining a repair cost estimate for repairing the first exterior body panel; and generating a repair and repainting cost estimate based on the repainting cost estimate and the repair cost estimate.

9. The one or more non-transitory machine-readable storage media of claim 8, wherein determining a repair cost estimate for repairing the first exterior body panel comprises:

determining a severity of damage to the first exterior body panel.

10. The one or more non-transitory machine-readable storage media of claim 7, the operations further comprising:

providing the repair and repainting cost estimate to a claims adjuster.

11. The one or more non-transitory machine-readable storage media of claim 7, the operations further comprising:

obtaining one or more training data sets comprising the historical examples of the first regions, corresponding second regions, and corresponding confidence values; and training the one or more trained machine learning models using the training data set.

12. The one or more non-transitory machine-readable storage media of claim 11, the operations further comprising:

generating the one or more training data sets.

13. A computer-implemented method comprising:

receiving an image of a vehicle having damage to a first exterior body panel of the vehicle;

providing the image to one or more trained machine learning models, wherein based on the image of the vehicle, the one or more trained machine learning models are configured to determine a first region of the first exterior body panel to be repaired and a second region to be paint-blended, wherein the second region surrounds the first region, wherein the first region is a first polygon circumscribing the first region and the second region is a second polygon circumscribing the second region, wherein output of the one or more trained machine learning models comprises an identification of the first region, an identification of the second region, and a confidence value associated with the second region, and wherein the one or more trained machine learning models trained with historical examples of the first regions, corresponding second regions, and corresponding confidence values;

when the confidence value associated with the second region exceeds a confidence threshold and the second region contains a second exterior body panel of the vehicle other than the first exterior body panel, generating an exterior body panel repainting list that includes the identification of the first exterior body panel of the vehicle and the identification of the second exterior body panel of the vehicle;

querying a repainting cost database using the exterior body panel repainting list; and receiving a repainting cost estimate from the repainting cost database responsive to the querying.

14. The computer-implemented method of claim 13, further comprising:

determining a repair cost estimate for repairing the first exterior body panel; and generating a repair and repainting cost estimate based on the repainting cost estimate and the repair cost estimate.

15. The computer-implemented method of claim 14, wherein determining a repair cost estimate for repairing the first exterior body panel comprises:

determining a severity of damage to the first exterior body panel.

16. The computer-implemented method of claim 13, further comprising:

providing the repair and repainting cost estimate to a claims adjuster.

17. The computer-implemented method of claim 13, further comprising:

obtaining one or more training data sets comprising the historical examples of the first regions, corresponding second regions, and corresponding confidence values; and training the one or more trained machine learning models using the training data set.

18. The computer-implemented method of claim 17, further comprising:

generating the one or more training data sets.

* * * * *